United States Patent
Wu

(10) Patent No.: US 9,872,186 B2
(45) Date of Patent: Jan. 16, 2018

(54) METHOD OF MONITORING CALL STATE OVER SINGLE RADIO VOICE CALL CONTINUITY AND RELATED COMMUNICATION DEVICE

(71) Applicant: HTC Corporation, Taoyuan County (TW)

(72) Inventor: Chih-Hsiang Wu, Taoyuan County (TW)

(73) Assignee: HTC Corporation, Taoyuan (TW)

(*) Notice: Subject to any disclaimer, the term of this patent is extended or adjusted under 35 U.S.C. 154(b) by 365 days.

(21) Appl. No.: 13/917,660

(22) Filed: Jun. 14, 2013

(65) Prior Publication Data

US 2013/0336127 A1 Dec. 19, 2013

Related U.S. Application Data

(60) Provisional application No. 61/659,437, filed on Jun. 14, 2012.

(51) Int. Cl.
*H04W 36/00* (2009.01)
*H04W 24/08* (2009.01)

(52) U.S. Cl.
CPC ....... *H04W 24/08* (2013.01); *H04W 36/0022* (2013.01)

(58) Field of Classification Search
CPC . H04W 36/0022; H04W 36/32; H04W 40/36; H04W 36/14; H04W 76/02; H04W 36/0016; H04W 36/28; H04L 65/1016
USPC .................................................. 370/331, 352
See application file for complete search history.

(56) References Cited

U.S. PATENT DOCUMENTS

| | | | |
|---|---|---|---|
| 8,203,589 B2* | 6/2012 | Jackson | H04L 12/1818 348/14.01 |
| 2005/0073977 A1 | 4/2005 | Vanghi | |
| 2009/0232097 A1 | 9/2009 | Taneja | |

(Continued)

FOREIGN PATENT DOCUMENTS

| | | |
|---|---|---|
| CN | 101123639 A | 2/2008 |
| WO | 2010133112 A1 | 11/2010 |

(Continued)

OTHER PUBLICATIONS

European patent application No. 13020039.7, European Search Report mailing date: Jan. 3, 2014.

(Continued)

*Primary Examiner* — Sai Aung
(74) *Attorney, Agent, or Firm* — Winston Hsu

(57) ABSTRACT

A method of monitoring a call state over a single radio voice call continuity (SRVCC) handover, for a communication device in a wireless communication system is provided. The method includes performing, by a modem processor of the communication device, the SRVCC handover from a first type call to a second type call when an SRVCC handover command is received from a network of the wireless communication system, sending, by the modem processor, a first indication for notifying an occurrence of SRVCC handover to an application processor of the communication device, and monitoring, by the application processor, a call state of the second type maintained in the modem processor after the first indication is received.

10 Claims, 11 Drawing Sheets

(56) References Cited

U.S. PATENT DOCUMENTS

| | | | |
|---|---|---|---|
| 2010/0074224 A1* | 3/2010 | Mahdi | H04W 36/0022 370/331 |
| 2011/0206003 A1 | 8/2011 | Wu | |
| 2012/0057569 A1* | 3/2012 | Xie | H04W 36/385 370/331 |
| 2012/0120914 A1* | 5/2012 | Sedlacek | H04W 60/005 370/331 |
| 2012/0207127 A1* | 8/2012 | Xie | H04W 36/0022 370/331 |
| 2012/0213197 A1* | 8/2012 | Niemi | H04W 36/0022 370/331 |
| 2013/0016698 A1* | 1/2013 | Keller | H04W 36/14 370/331 |
| 2013/0142168 A1* | 6/2013 | Vedrine | H04W 36/0022 370/331 |
| 2013/0188603 A1* | 7/2013 | Nishida | H04W 40/36 370/331 |

FOREIGN PATENT DOCUMENTS

| | | |
|---|---|---|
| WO | 2011097966 A1 | 8/2011 |
| WO | 2011098137 A1 | 8/2011 |
| WO | 2011110001 A1 | 9/2011 |
| WO | 2011127790 A1 | 10/2011 |

OTHER PUBLICATIONS

3GPP TS 23.216 V11.4.0 (Mar. 2012), "3rd Generation Partnership Project; Technical Specification Group Services and System Aspects; Single Radio Voice Call Continuity (SRVCC); Stage 2 (Release 11)", XP050555332, p. 1-64.

Office action mailed on Oct. 27, 2014 for the Taiwan application No. 102121271, filing date: Jun. 14, 2013, p. 1-3.

3GPP TS 23.216 v11.4.0, "3rd Generation Partnership Project; Technical Specification Group Services and System Aspects; Single Radio Voice Call Continuity (SRVCC); Stage 2; (Release 11)", Mar. 2012.

3GPP TS 24.008 v11.2.1 "3rd Generation Partnership Project; Technical Specification Group Core Network and Terminals; Mobile radio interface Layer 3 specification; Core network protocols; Stage 3 (Release 11)", Mar. 2012.

Office action mailed on Oct. 30, 2015 for the China application No. 201310259252.1, filing date Jun. 14, 2013, p. 1-9.

\* cited by examiner

METHOD OF MONITORING CALL STATE OVER SINGLE RADIO VOICE CALL CONTINUITY AND RELATED COMMUNICATION DEVICE

CROSS REFERENCE TO RELATED APPLICATIONS

This application claims the benefit of U.S. Provisional Application No. 61/659,437, filed on Jun. 14, 2012 and entitled "Method and apparatus for performing SRVCC in smartphone device", the contents of which are incorporated herein in their entirety.

BACKGROUND OF THE INVENTION

1. Field of the Invention

The present invention relates to a method used in a communication device in a wireless communication system, and more particularly, to a method of monitoring a call state over a single radio voice call continuity.

2. Description of the Prior Art

Internet-Protocol (IP) Multimedia Subsystem, hereafter called IMS, is a set of specifications that describes the Next Generation Networking (NGN) architecture for implementing IP based telephony and multimedia services. IMS defines a complete architecture and framework, which enables a convergence of voice, video, data and mobile network technology over an IP-based infrastructure. Session Initiated Protocol (SIP), Session Description Protocol (SDP), and Real-Time Transport Protocol (RTP) defined by the Internet Engineering Task Force (IETF), are chosen as main protocols for IMS. IMS fills a gap between the two most successful communication paradigms, cellular and Internet technology, and thereby enables users to surf Webs, play online games or join a videoconference through 3G handheld devices, i.e. user equipments (UEs). In short, IMS provides cellular access to all the services that the Internet provides. However, Long Term Evolution (LTE)/High Speed Packet Access (HSPA) only provide PS (packet-switched) services. Voice over IP (VoIP) is the only solution to support voice calls in an LTE/HSPA network.

A Single Radio Voice Call Continuity (SRVCC) refers to a voice call continuity between IMS over PS (packet-switched) access and CS (circuit-switched) access for calls which are anchored in IMS when a user equipment (UE) is capable of transmitting/receiving on only one of PS and CS access networks at a given time. On the other hand, a Single Radio Video Call Continuity (vSRVCC) refers to a video call continuity from an Evolved Universal Terrestrial Radio Access Network (E-UTRAN) to a UTRAN-CS for calls which are anchored in IMS when the UE is capable of transmitting/receiving on only one of the E-UTRAN and UTRAN-CS at a given time.

Please refer to FIG. 1, which is a schematic diagram of a wireless communication system 10. The wireless communication system 10 may include a PS network, a CS network and a UE. The PS network may be an LTE or HSPA network, and may include a plurality of LTE/HSPA base stations to provide IMS calls. The CS network may be a Mobile communications (GSM), Universal Mobile Telecommunications System (UMTS), or Code Division Multiple Access 2000 (CDMA2000) network, and may include a plurality of GSM/UMTS/CDMA2000 base stations to provide CS calls. The UE may be a device such as a mobile phone, a computer system, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

The UE may establish an IMS call with the PS network or establish a CS call with the CS network, and demonstrate a call state of the IMS/CS call on a user interface (not shown in FIG. 1) to its user. The PS network may request the UE to perform SRVCC handover for the IMS call from the PS network to the CS network by sending an SRVCC handover command, and the CS network may request the UE to perform SRVCC handover for the CS call from the CS network to the PS network by sending an SRVCC handover command.

However, the UE may physically be composed of two operating environments, one is called application side for running an operating system, providing the user interface (UI) and showing the call state on the UI, and the other is called modem side to perform wireless communication based on 3GPP/3GPP2 stacks. Besides, the IMS call may be implemented similar to some VoIP applications (e.g. Skype™), such that an IMS operation based on RTP, SIP, UDP, and IP protocol stacks, may be performed by the application side. Of course, the IMS operation may be performed by the modem side.

Applicant notices that the application side may have a difficulty to monitor a call state of a call over an SRVCC handover. After an SRVCC handover, assume that an IMS call is handed over to a CS call. A call state of the CS call may be initialized according to 3GPP/3GPP2 specification in the modem side. However, the application side does not get the call sate of the CS call since the call sate of the CS call is maintained in the modem side (e.g. different processors and different storages). Besides, the application side may keep running IMS protocol stack and encoding voice packets, which consumes power since the application side cannot enter a sleep mode (e.g. application processor cannot run in a lower clock). Similar issue also happens in SRVCC handover from the CS network to the PS network.

Therefore, there is a need to solve the above problems.

SUMMARY OF THE INVENTION

It is there for an objective to provide a method of monitoring call state over single radio voice call continuity to solve the above problems.

The present invention discloses a method of monitoring a call state over an SRVCC handover, for a communication device in a wireless communication system. The method includes performing, by a modem processor of the communication device, the SRVCC handover from a first type call to a second type call when an SRVCC handover command is received from a network of the wireless communication system; sending, by the modem processor, a first indication for notifying an occurrence of SRVCC handover to an application processor of the communication device; and monitoring, by the application processor, a call state of the second type call maintained in the modem processor after the first indication is received.

The present invention further discloses a method of monitoring a call state over an SRVCC handover, for a communication device in a wireless communication system. The method includes performing, by a modem processor of the communication device, the SRVCC handover from a first type call to a second type call when an SRVCC handover command is received from a network of the wireless communication system; sending, by an application processor of the communication device, a query message to the modem processor to query the call state of the second type call; and sending, by the modem processor, a response message corresponding to the query message containing the call state of the second type call, to the application processor after the SRVCC handover is performed successfully.

The present invention further discloses a method of monitoring a call state over an SRVCC handover, for a communication device in a wireless communication system. The method includes performing, by a modem processor of the communication device, handover from a first type call to a second type call when an SRVCC handover command is received from a network of the wireless communication system; and sending, by the modem processor, an first indication for indicating a call state of the second type call to an application processor of the communication device after the SRVCC handover.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
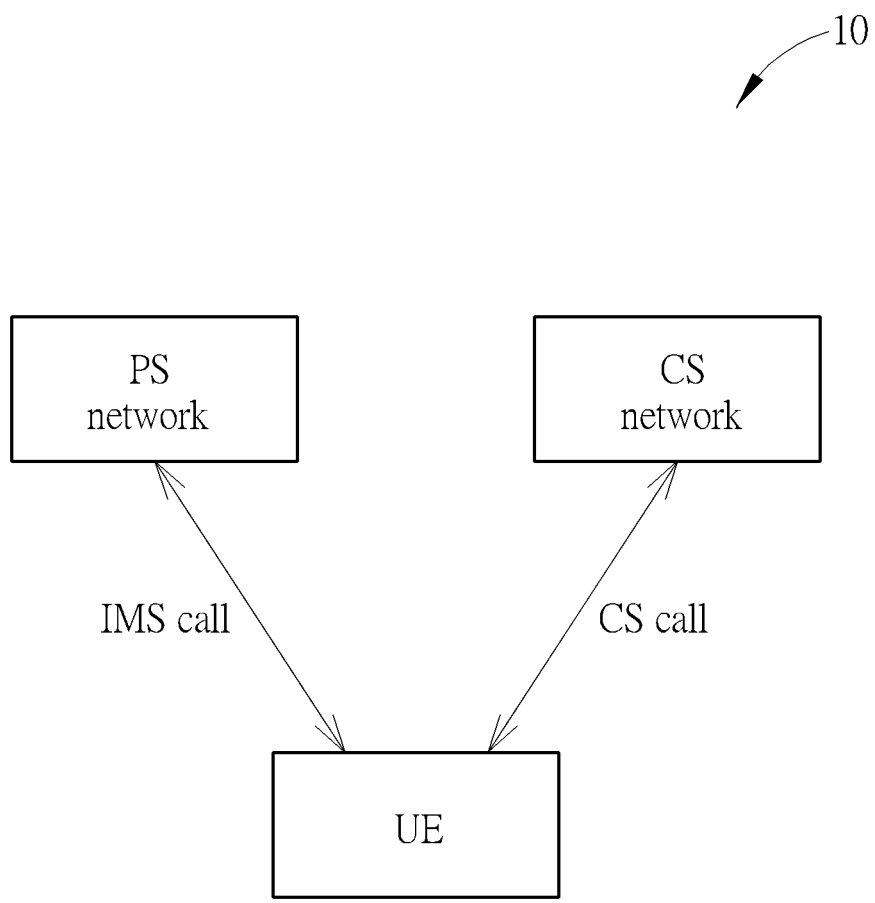
FIG. 1 is a schematic diagram of a wireless communication system.
Figure 2:
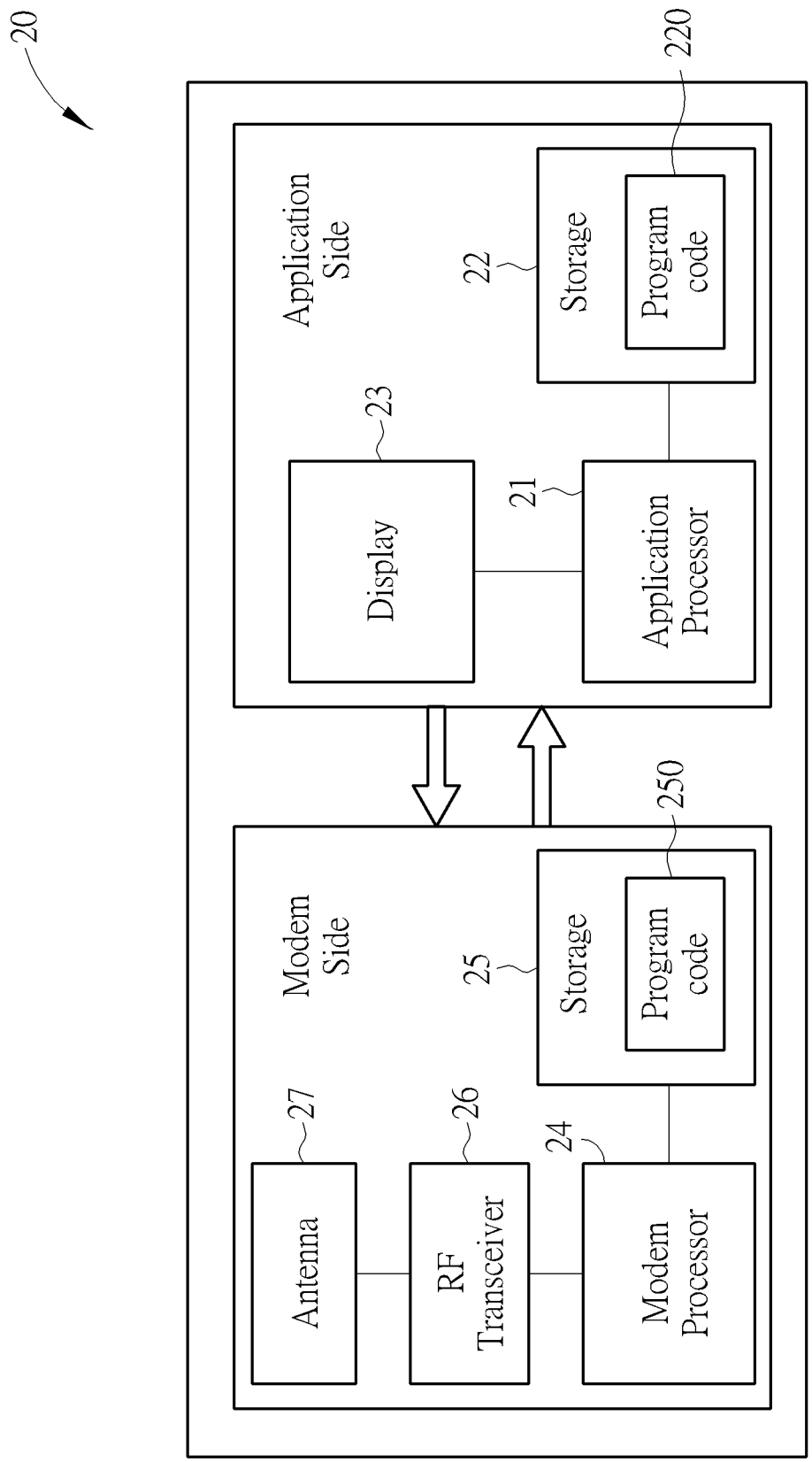
FIG. 2 illustrates an architecture of a communication device according to an embodiment of the present invention.

Please refer to FIG. 2, which illustrates an architecture of a communication device 20 according to an embodiment of the present invention. The communication device 20 may be the user equipment shown in FIG. 1. The communication device 20 may be separated into two operating environments, one is called an application side and the other is called a modem side. The application side may include an application processor 21, an application storage 22, and a display 23. The modem side may include a modem processor 24, a modem storage 25, a radio-frequency (RF) transceiver 26 and an antenna 27. The application processor 21 may be an ARM (Advanced RISC Machine) based processor, a MIPS (Microprocessor without Interlocked Pipeline Stages) based processor or an x86 based processor, and the application processor 21 may run an operating system (OS), e.g. Android, Windows phone 7, iPhone OS (iOS), to provide software applications and user interface (UI) on the display 23, as well as perform IMS operation based on RTP, SIP, UDP, and IP protocol stacks. The modem processor 24 may be an ARM based processor, and be able to run communication protocol software including 3GPP/3GPP2 protocol stacks to support LTE/HSPA/UMTS/GSM/CDMA2000 wireless communication technologies. The modem processor 24 may also perform IMS operation based on RTP, SIP, UDP, and IP protocol stacks according to practical requirement.

The application storage 22 and the modem storage 25 may be any data storage device that stores data including program codes 220 and 250, thereafter read and processed by the application processor 21 and modem processor 24, respectively. Examples of the application storage 22 and the modem storage 25 include a subscriber identity module (SIM), read-only memory (ROM), random-access memory (RAM), CD-ROMs, magnetic tapes, hard disks, optical data storage devices, and carrier waves (such as data transmission through the Internet). The RF transceiver 26 may be used for wirelessly communicating with other communication devices and can transform process results from the modem processor 24 into radio signals.

Figure 3:
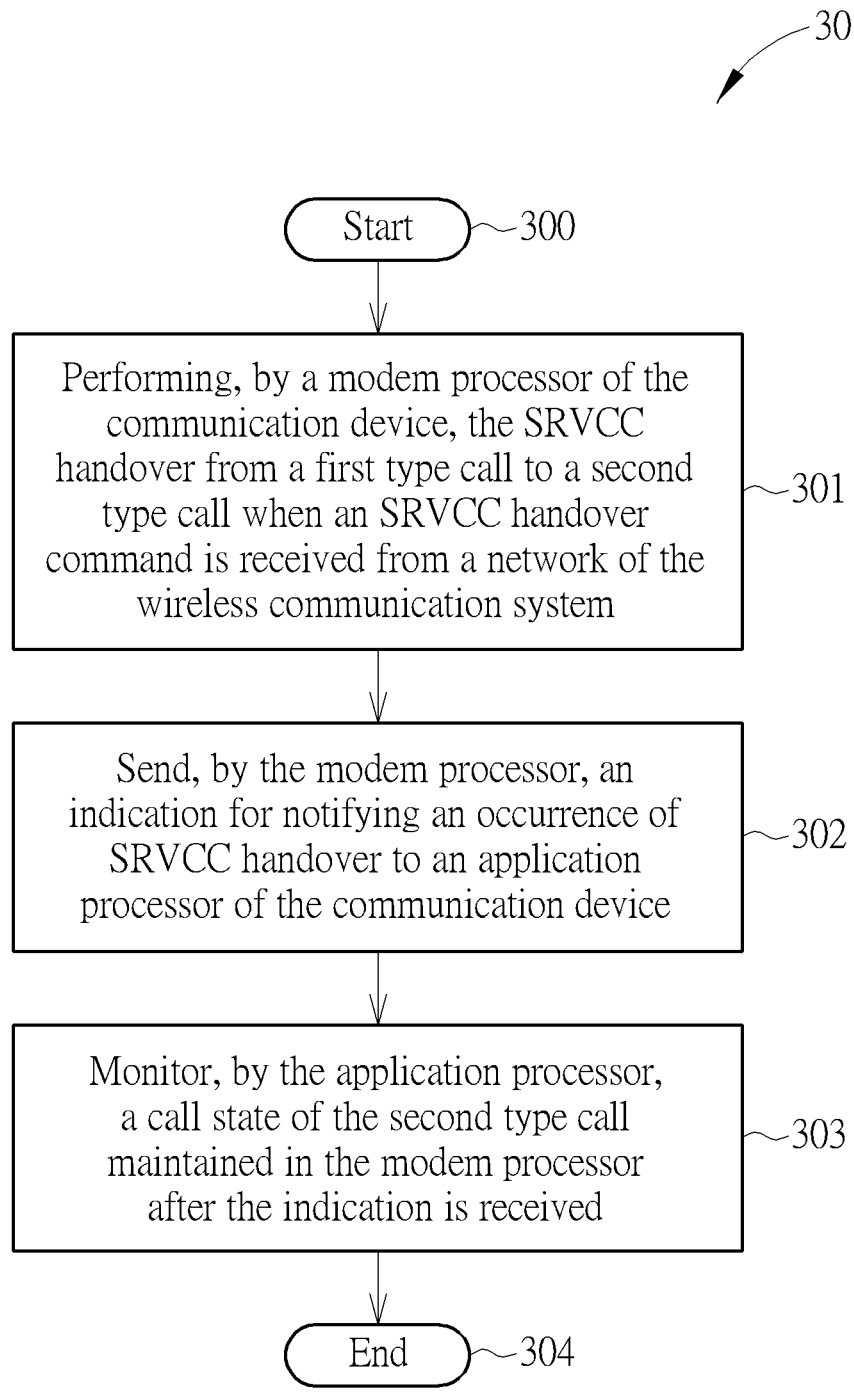
FIG. 3 is a flowchart of a process according to an embodiment of the present invention.

Please refer to FIG. 3, which is a flowchart of a process 30 according to an embodiment of the present invention. The process 30 is utilized in the communication device 20 for maintaining a call state over an SRVCC handover. The process 30 may be compiled into the program code 220 or 250 to be stored in both or one of the application storage 22 and the modem storage 25, and the process 30 may include the following steps:

Step 300: Start.

Step 301: Performing, by a modem processor of the communication device, the SRVCC handover from a first type call to a second type call when an SRVCC handover command is received from a network of the wireless communication system.

Step 302: Send, by the modem processor, an indication for notifying an occurrence of SRVCC handover to an application processor of the communication device.

Step 303: Monitor, by the application processor, a call state of the second type call type maintained in the modem processor after the indication is received.

Step 304: End.

In process 30, the modem side, i.e. the modem processor 24, sends an indication to the application side, i.e. the application processor 21, to notify an occurrence of the SRVCC handover before or after the SRVCC handover is completely finished, thereby the application side goes to monitor the call state of the second type call, so as to demonstrate the call state of the second type call on the user interface of the display 23.

In an embodiment, the first type call is an IMS call and the second type call is a CS call, i.e. the IMS call is handed over to the CS call. The application side is notified the occurrence of the SRVCC handover according to the indication sent by the modem side after the SRVCC handover is performed successfully, and knows that the IMS call is switched to the CS call. Therefore, the application side may go to monitor the call state of the CS call maintained in the modem side to demonstrate the call state of the CS call on the user interface of the display 23. In addition, after the indication is received, the application side stops operation for the IMS call to enter a sleep mode or run with a lower clock to save power consumption because the IMS call would be released after the SRVCC handover is completed. The modem side may start the CS call and the CS operation after the SRVCC handover command is received.

In another embodiment, the first type call is a CS call and the second type call is an IMS call, i.e. the CS call is handed over to the IMS call. The modem side may stop operation for the CS call after the SRVCC handover command is received. The application side may be notified the occurrence of the SRVCC handover according to the indication to know that the CS call is switched to the IMS call. Therefore, the application side may initiate the IMS call, start operation for the IMS call, maintain the call state of the IMS call, as well as demonstrate the call state of the IMS call on the user interface of the display 23.

There are several ways for the application side to monitor and access the call state maintained in the modem side. In the first embodiment, after the application side receives the indication, the application side sends a query message to the modem side, and receives a response message corresponding to the query message and containing the call state of the second type call, from the modem processor. As a result, the application side may monitor the call state of the second type call by actively sending the request message to the modem side and receiving the response message corresponding to the query message from the modem side.

Noticeably, the modem side shall not send the response message corresponding to the query message if the query message is received during the SRVCC handover. In other words, the modem side may send the response message corresponding to the query message after the SRVCC handover is performed successfully. For example, the modem side receives the query message during the SRVCC handover (i.e. the SRVCC handover has not finished and IMS call is released). In this situation, the modem side does not return the response message indicating the IMS call is released to the application side. From a user perspective, the user should not be aware of an active call is switched between different network domains. The first type call may be released and disconnected during the SRVCC handover procedure. In such a situation, the modem side shall not send any messages indicating the first type call is released during SRVCC handover, which may avoid confusing the application side that the first type call is released suddenly and may prevent the user interface from showing the first type call is disconnected. In other words, the modem side shall not, is forbidden to, to send any response messages containing the call state of the first type call after the SRVCC handover command is received to avoid the application side from showing the first type call is disconnected on the user interface.

Figure 4:
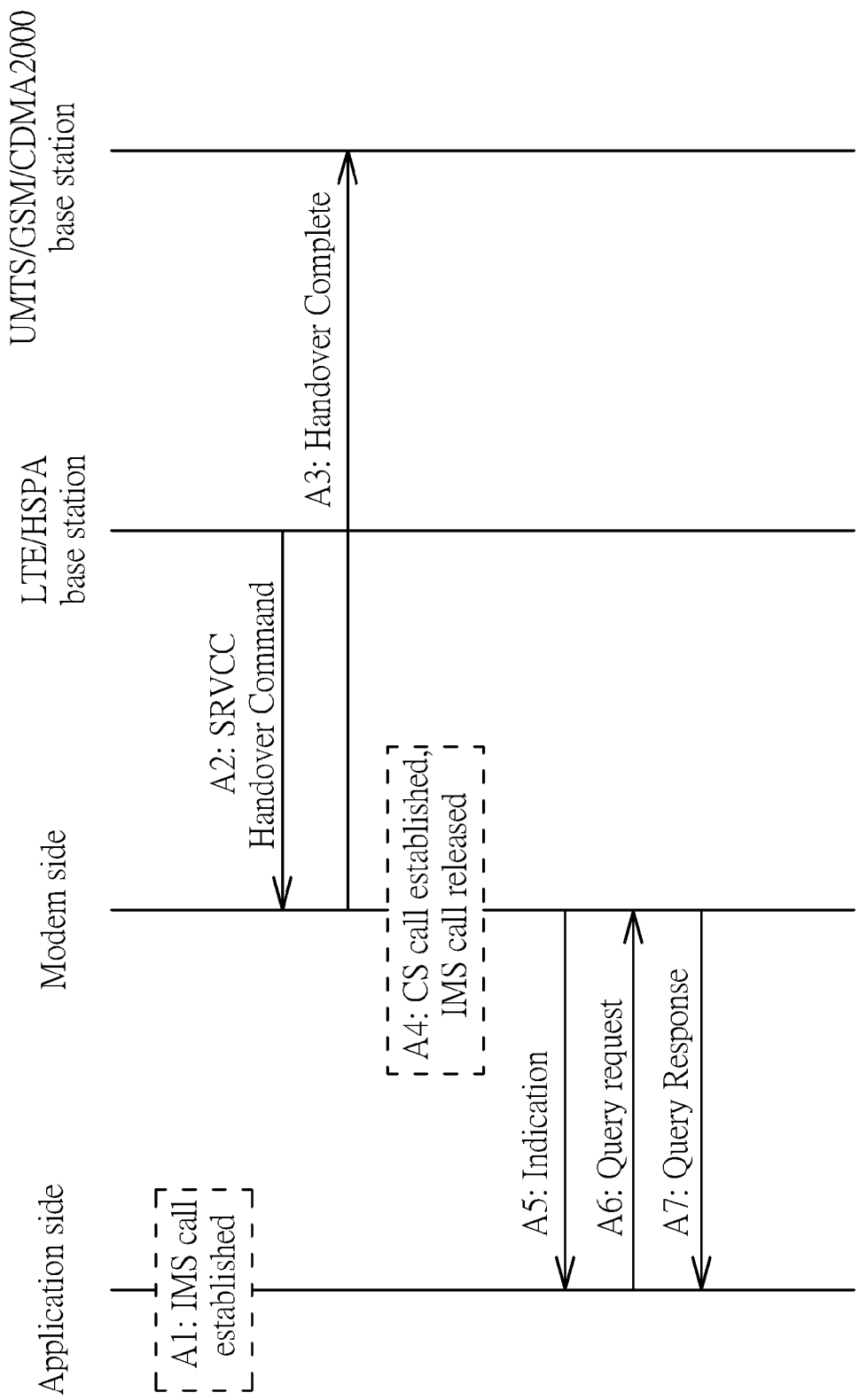
FIG. 4 illustrates a sequence diagram of monitoring a call state over an SRVCC handover according to an embodiment of the present invention.

Specifically, please refer to FIG. 4, which illustrates a sequence diagram of monitoring a call state over an SRVCC handover according to an embodiment of the present invention. As shown in FIG. 4, in step A1, it is assumed that an IMS call is established and a call state and an IMS operation of the IMS call are handled by the application side. In operation, the application side may handle voice/video coding/decoding of voice/video packets and maintain the call state of the IMS call, so as to demonstrate the call state of the IMS call on the user interface of the display 23. For example, the call state may be active, held, dialing, alerting, incoming, or waiting. The modem side may perform 3GPP/3GPP2 stacks for wireless communication to deliver voice/video packets generated by the application side. In step A2, an LTE/HSPA base station may send an SRVCC handover command to instruct the communication device 20 to handover the IMS call in the PS network to a CS call in the CS network. In step A3, the modem side may perform SRVCC handover in response to the SRVCC handover command. After the SRVCC handover is completed, in step A4, the CS call may be established with the GSM/UMTS/CDMA2000 base station and a call state of the CS call may be initialized and maintained by modem side, and the IMS call may be released afterwards.

In step A5, the modem side sends the indication to the application side after the SRVCC handover is completed, i.e. the indication is sent after a Handover Complete message (not shown in FIG. 4). In order to monitor the call state of the CS call maintained in the modem side, in step A6, the application side may send a query message to the modem side to request the call state of the CS call. In step A7, the modem side may send a response message containing the call state of the CS call in response to the query message, such that the application side may monitor and demonstrate the call state of the CS call on the user interface according to the response message.

In the second embodiment, the query and response messages may correspond to specific types to indicate a call type of a call currently established or currently in use. Before the indication for notifying the occurrence of SRVCC handover is received, the query message sent by the application side may be mapped into a first type and the response message sent by the modem side may be also mapped into the first type to indicate the call currently established or currently in use is the first type call. After the indication for notifying the occurrence of SRVCC handover is received, the query message sent by the application side may be mapped into a second type and the response message sent by the modem side may be also mapped into the second type to indicate the call currently established or currently in use is the second type call.

In a word, the modem side sends the response message being mapped into the second type which is different from the response message being mapped into the first type, such that the application side may be notified that the call type of the call currently established is changed. As a result, the application side may be notified that the call currently established or currently in used is a CS call or an IMS call according to the type of the response message from the modem side.

In the third embodiment, the modem side may automatically send an indication for indicating the call state of the second type call to the application side after the SRVCC handover. Moreover, the mode side sends another indication for indicating the call state of the second type call to the application side only when the call state of the second type changes. The other indication may contain a call state, e.g. held or disconnect, which is different from the call stat contained in the indication, e.g. active.

Figure 5:
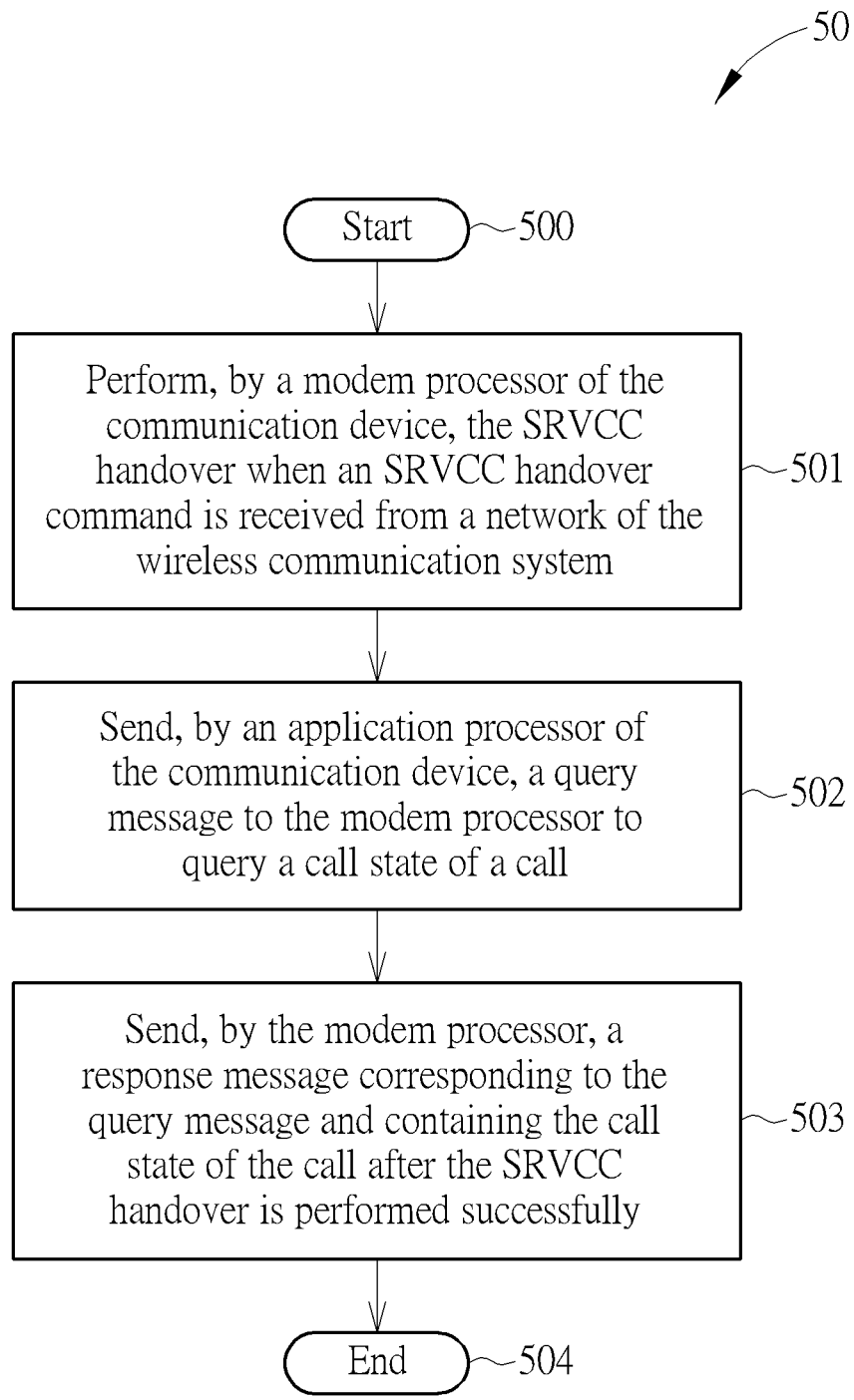
FIG. 5 is a flowchart of a process according to an embodiment of the present invention.

Please refer to FIG. 5, which is a flowchart of a process 50 according to an embodiment of the present invention. The process 50 is utilized in the communication device 20 for monitoring a call state over an SRVCC handover. The process 50 may be compiled into a program code to be stored in both or one of the application storage 22 and the modem storage 25, and the process 50 may include the following steps:

Step 500: Start.

Step 501: Perform, by a modem processor of the communication device, the SRVCC handover when an SRVCC handover command is received from a network of the wireless communication system.

Step 502: Send, by an application processor of the communication device, a query message to the modem processor to query a call state of a call.

Step 503: Send, by the modem processor, the response message corresponding to the query message and containing the call state of the call after the SRVCC handover is performed successfully.

Step 504: End.

In process 50, the application side may periodically send a query message to the modem side to query the call state, and the modem side may send a response message corresponding to the query message and containing the call state to the application side.

Noticeably, the modem side does not return the response message to the application side if the query message is received during the SRVCC handover. In other words, the modem side sends the response message after the SRVCC handover is completed, which may avoid confusing the application side that the call is suddenly released during the SRVCC handover. In addition, from a user perspective, the user should not be aware of the call currently established is switched between different network domains. The IMS/CS call may be released to disconnect from the PS or CS network during the SRVCC handover. In such a situation, the modem side shall not send any message indicating the IMS/CS call is released during the SRVCC handover, which may avoid confusing the application side that the call currently established is released suddenly and prevent the user interface from showing the call currently established is disconnected. Alternatively the modem side returns the response message indicating the call state before the SRVCC handover is occurred to the application side if the query message is received during the SRVCC handover. In a word, the modem side returns the response message containing a previous call state of the first type call.

Figure 6:
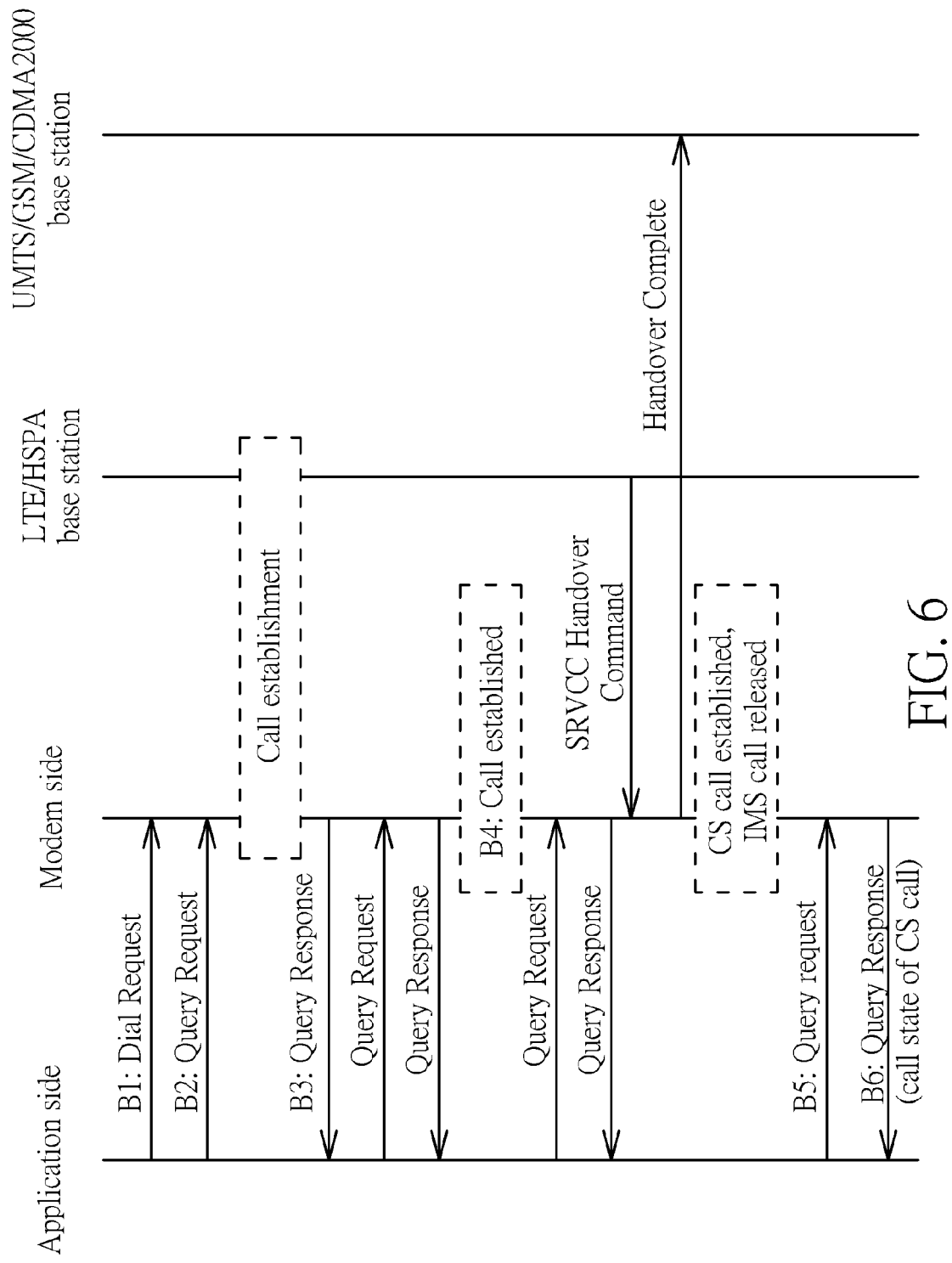
FIG. 6 illustrates a sequence diagram of monitoring a call state over an SRVCC handover according to an embodiment of the present invention.

Specifically, please refer to FIG. 6, which illustrates a sequence diagram of monitoring a call state over an SRVCC handover according to another embodiment of the present invention. As shown in FIG. 6, in step B1, the application side may send a dial request for instructing the modem side to initiate a call which is assumed an IMS call. In step B2, the application side may periodically send a query message to the modem side to query the call state. In step B3, the modem side may send a response message corresponding to the query message and containing the call state. Meanwhile, in step B4, the modem side may establish the call with the LTE/HSPA base station according to the dial request. After the call is established, the modem side may send a response message containing the call state, e.g. active, to the application side.

During the SRVCC handover, the modem side does not send any response message to avoid confusing the application side that the call is suddenly released. In step B5, the application side just keeps sending the query message to the modem in order to monitor the call state. After the SRVCC handover is performed successfully and the call is established with the GSM/UMTS/CDMA2000 base station, in step B6, the modem side may send a response message corresponding to the query message and containing the call state of the call, which is a CS call, to the application processor.

Figure 7:
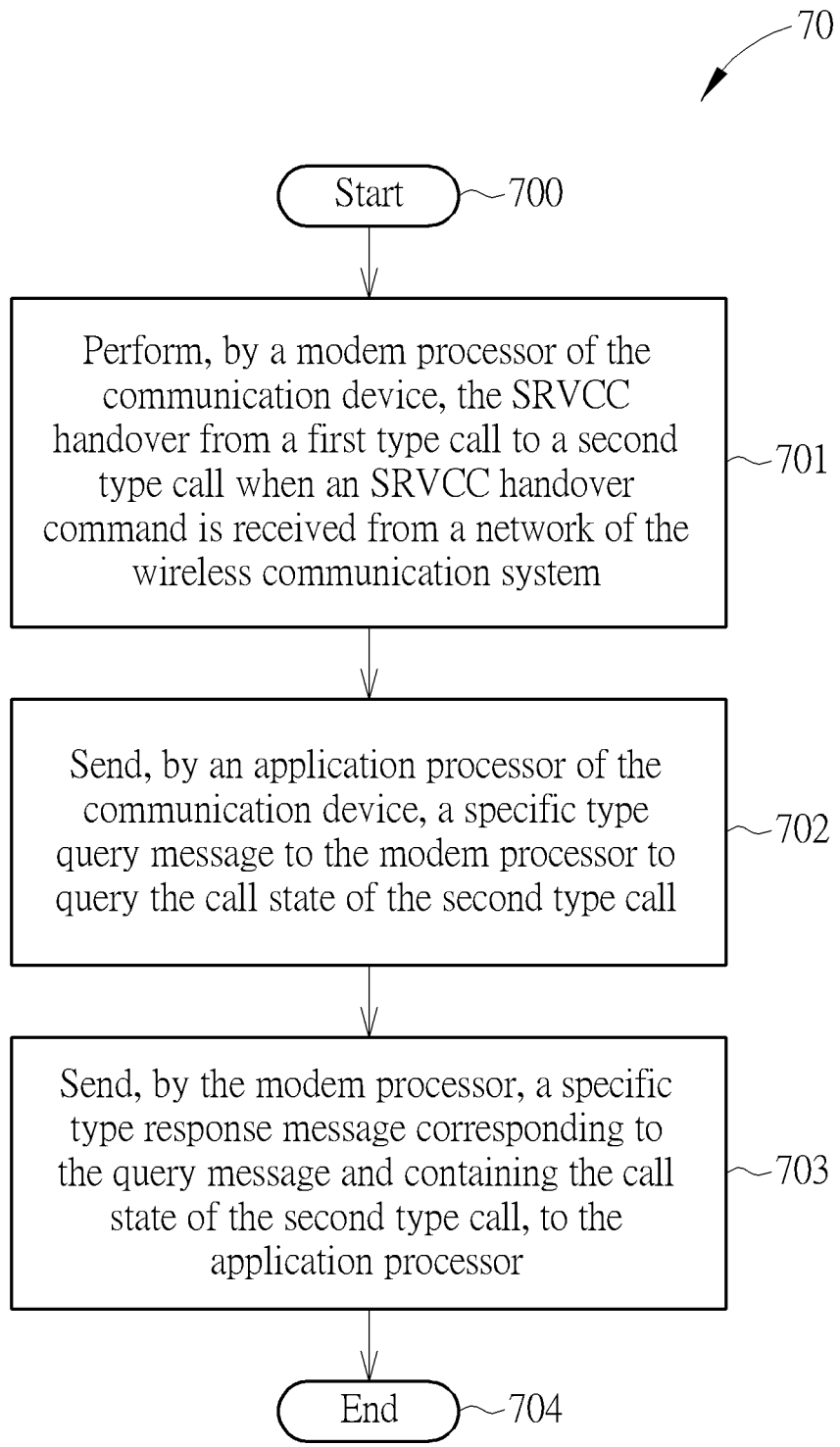
FIG. 7 is a flowchart of a process according to an embodiment of the present invention.

Please refer to FIG. 7, which is a flowchart of a process 70 according to an embodiment of the present invention. The process 70 is utilized in the communication device 20 for monitoring a call state over an SRVCC handover. The process 70 may be compiled into a program code to be stored in both or one of the application storage 22 and the modem storage 25, and the process 70 may include the following steps:

Step 700: Start.

Step 701: Perform, by a modem processor of the communication device, the SRVCC handover from a first type call to a second type call when an SRVCC handover command is received from a network of the wireless communication system.

Step 702: Send, by an application processor of the communication device, a specific type query message to the modem processor to query the call state of the second type call.

Step 703: Send, by the modem processor, a specific type response message corresponding to the query message and containing the call state of the second type call, to the application processor.

Step 704: End.

According to process 70, the application side may send a specific type query message to the modem side to query the call state of the second type call, and the modem side may send a specific type response message corresponding to the query message and containing the call state of the second type call, to the application side. In other words, the specific type of the query and response messages may be mapped into a call type, which may be recognized by the application side and the modem side to indicate a call type of the call currently established or currently in use. For example for a CS call, a query message may be CS_call_query and a response message may be CS_call_response, and for a IMS call, a query message may be IMS_call_query and a response message may be IMS_call_response.

In another embodiment, the modem side further sends an indication for notifying an occurrence of SRVCC handover to the application side, such that the application side is notified that the call type of the call currently established or currently in use is changed. In this situation, the application side sends a query message corresponding to another type to the modem side.

Figure 8:
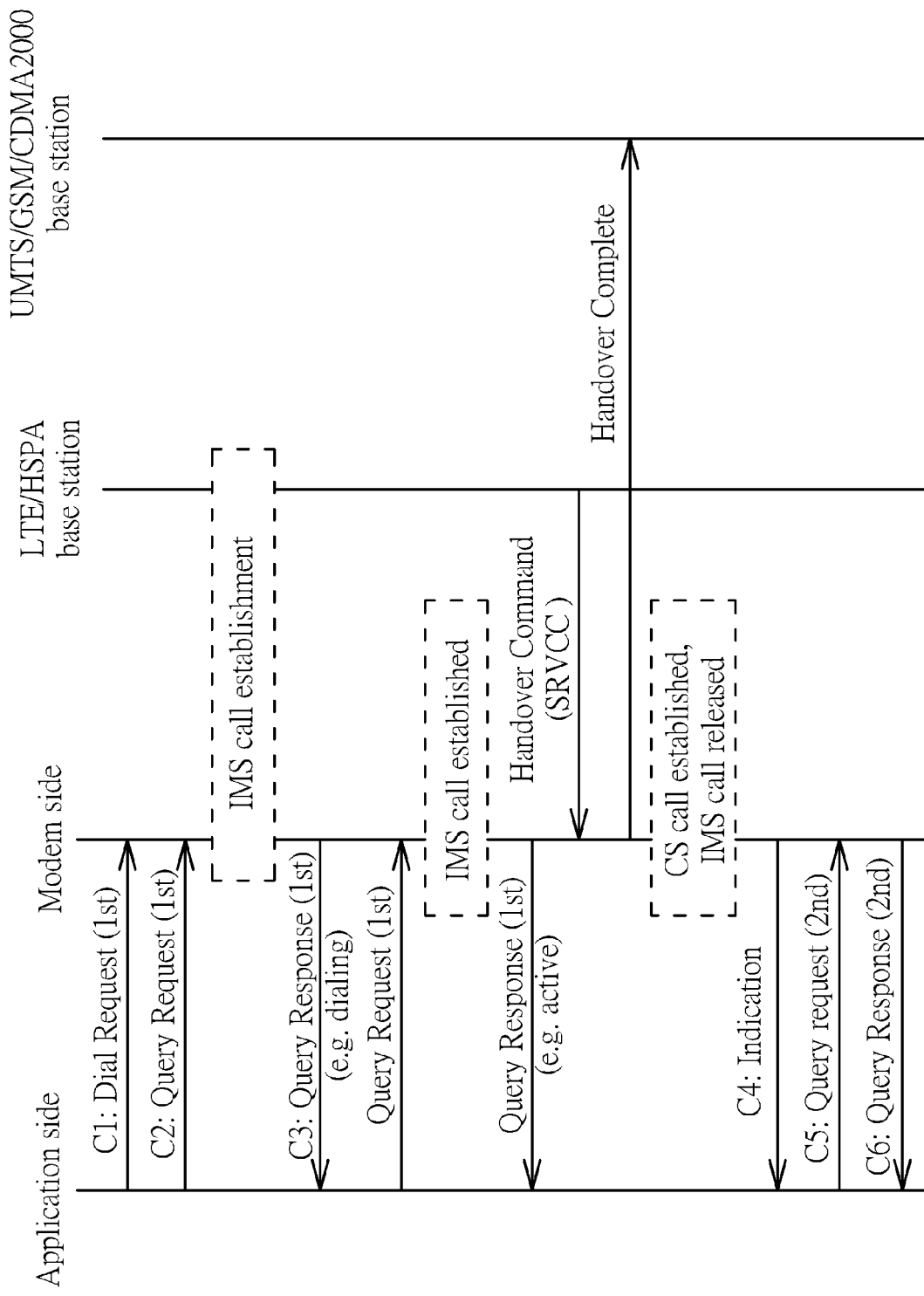
FIG. 8 illustrates a sequence diagram of monitoring a call state over an SRVCC handover according to an embodiment of the present invention.

Specifically, please refer to FIG. 8, which illustrates a sequence diagram of monitoring a call state over an SRVCC handover according to another embodiment of the present invention. For example, it is assumed that an IMS operation is handled by the modem side. In step C1, a dial request is sent by the application side because a user dials a phone number. When the modem side receives the dial request, the modem side initiates IMS call establishment. In steps C2 to C3, a query message sent by the application side may correspond to a first type and a response message sent by the modem side may correspond to the first type to indicate a call currently state. In step C4, the modem side may send an indication to the application side for notifying an occurrence of the SRVCC handover, such that the application side may know that the IMS call is handed over to a CS call. Accordingly, in step C5-C6, the application side may send a query message corresponding to a second type to query the call state of the CS call, and the modem side may send a response message corresponding to a second type and containing the call state of the CS call to the application side. In a word, after receiving the SRVCC handover occurrence indication, the application side stops sending the first format query message and sends the second format query message (e.g. periodically) for the call state of the CS call, and thereby the modem side knows to returns the call state of the CS call according to the format of the query message from the application.

Figure 9:
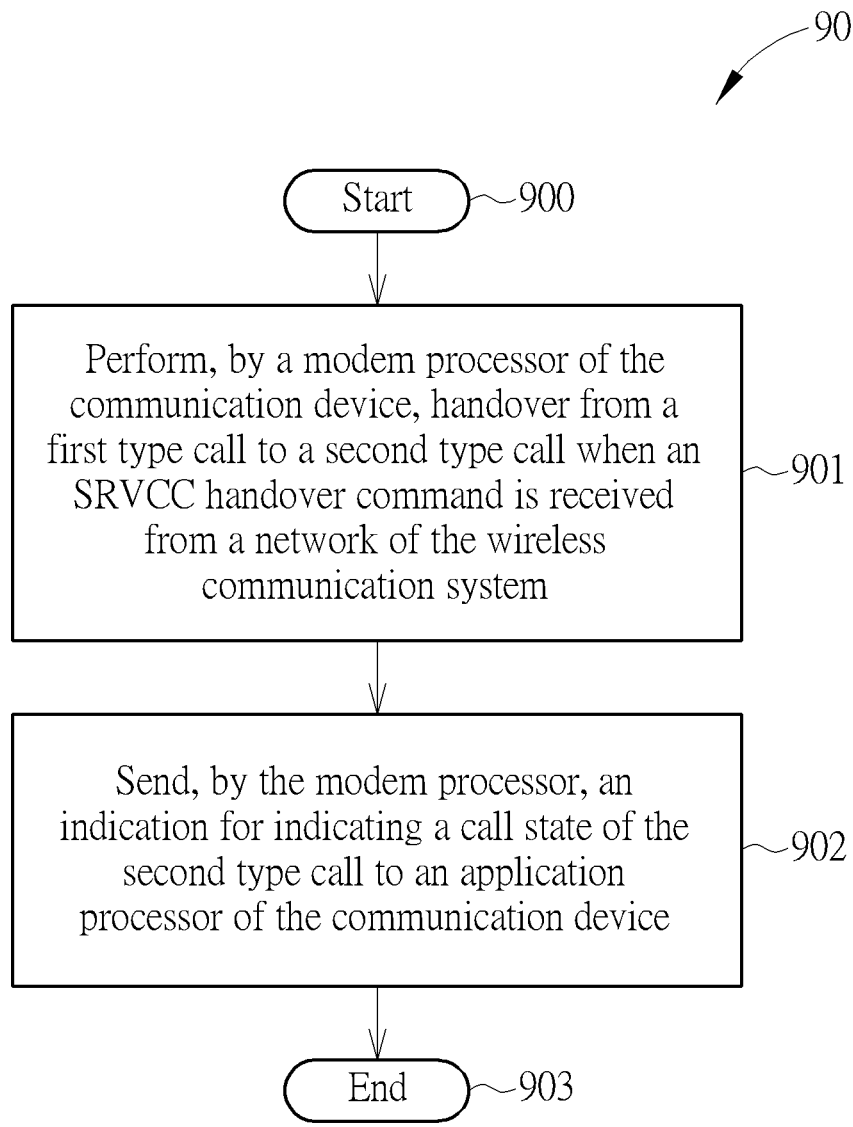
FIG. 9 is a flowchart of a process according to an embodiment of the present invention.

Please refer to FIG. 9, which is a flowchart of a process 90 according to an embodiment of the present invention. The process 90 is utilized in the communication device 20 for monitoring a call state over an SRVCC handover. The process 90 may be compiled into a program code to be stored in both or one of the application storage 22 and the modem storage 25, and the process 90 may include the following steps:

Step 900: Start.

Step 901: Perform, by a modem processor of the communication device, handover from a first type call to a second type call when an SRVCC handover command is received from a network of the wireless communication system.

Step 902: Send, by the modem processor, an indication for indicating a call state of the second type call to an application processor of the communication device after the SRVCC handover.

Step 903: End.

According to process 90, the modem side automatically sends an indication for indicating a call state of the second type call to the application side after the SRVCC handover, such that the application side may demonstrate the call state of the second type call on the user interface according to the indication. Moreover, the modem side may send another indication for indicating the call state of the second type call when the call state of the second type call changes. In other words, the modem side may actively update the call state of the second type call.

Figure 10:
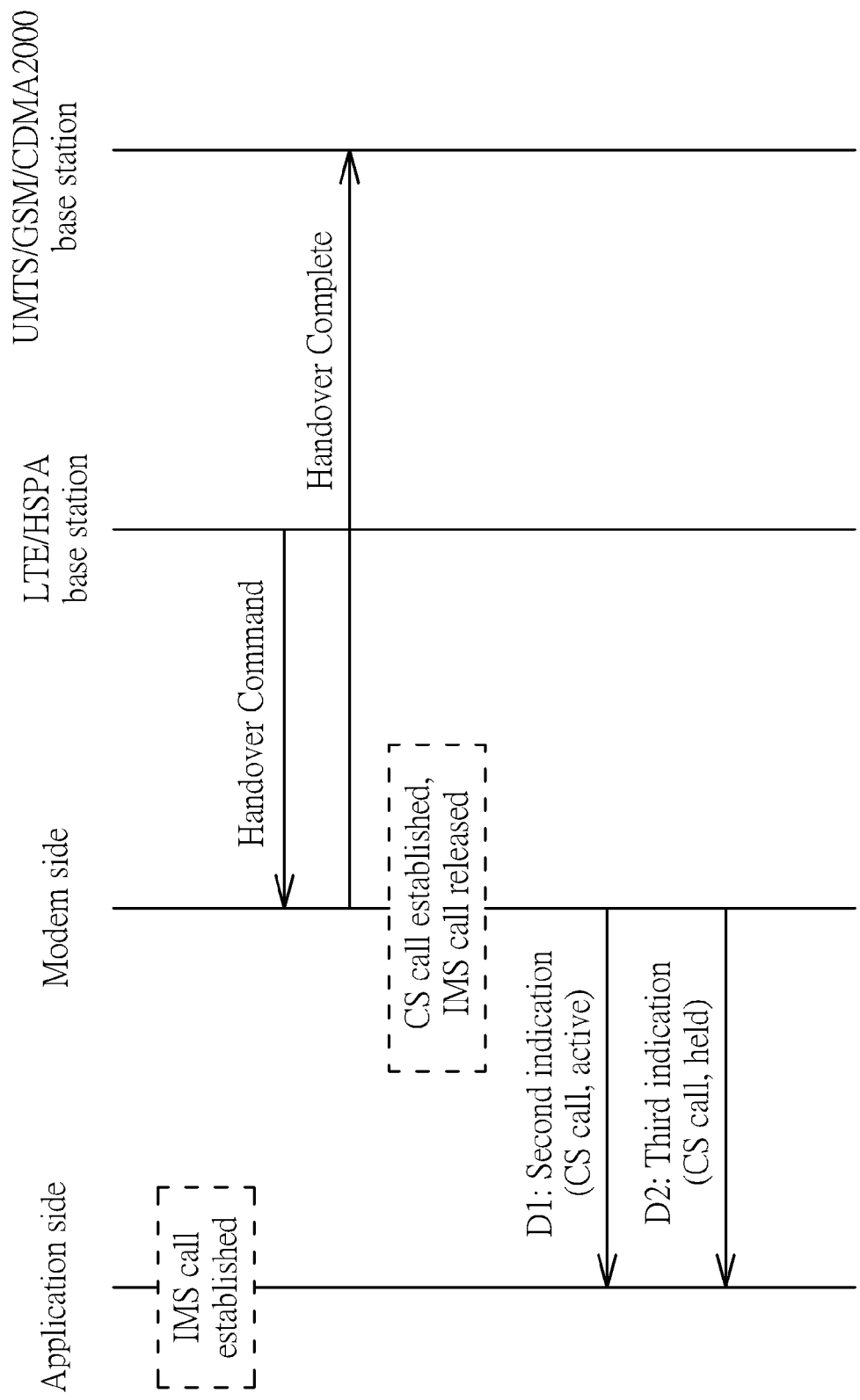
FIG. 10 illustrates a sequence diagram of monitoring a call state over an SRVCC handover according to an embodiment of the present invention.

Specifically, please refer to FIG. 10, which illustrates a sequence diagram of monitoring a call state over an SRVCC handover according to another embodiment of the present invention. It is assumed that the application side performs IMS operation. In FIG. 10, the modem side actively provides the call state of the second type call to the application side without query from application side. In detail, the modem side sends a second indication for indicating the call state of the CS call to the application after SRVCC handover (step D1). Moreover, the modem side may send a third indication for indicating the call state of the CS call to the application processor only when the call state of the CS call changes (step D2). In other words, the modem side may actively update the call state of the CS call if the call state of the CS call is changed from a first state, e.g. active, to a second state, e.g. held. It is noted that step D1 may be omitted if the modem side sends an indication for notifying the occurrence of SRVCC handover to the application processor.

Figure 11:
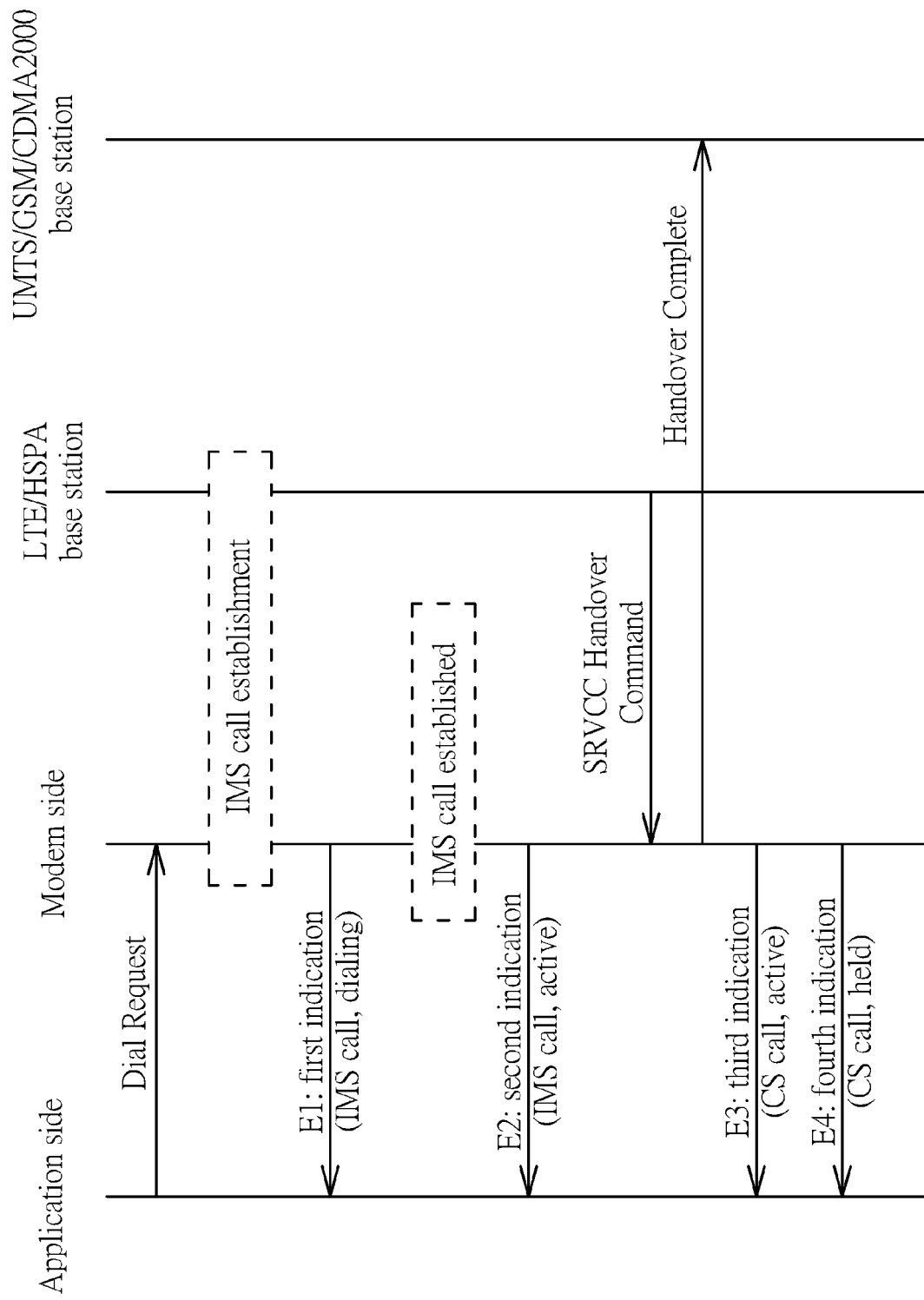
FIG. 11 illustrates a sequence diagram of monitoring a call state over an SRVCC handover according to an embodiment of the present invention.

Alternatively, please refer to FIG. 11, which illustrates a sequence diagram of monitoring a call state over an SRVCC handover according to another embodiment of the present invention. In FIG. 11, it is assumed that the modem side performs IMS operation. The modem side initiates IMS call establishment upon receiving a dial request from the application side. The modem side actively provides the call state of the second type call to the application side without query from application side. In detail, the modem side sends a first indication for indicating the call state of the IMS call, e.g. dialing (step E1). Then, the modem side sends a second indication for updating the call state of the IMS call, e.g. active after the IMS is established (step E2). The modem side sends a third indication for indicating the call state of the CS call to the application after SRVCC handover (step E3). Moreover, the modem side may send a fourth indication for indicating the call state of the CS call to the application processor only when the call state of the CS call changes (step E4). In other words, the modem side may actively update the call state of the CS call if the call state of the CS call is changed from a first state, e.g. active, to a second state, e.g. held. It is noted that step E3 may be omitted if the modem side sends an indication for notifying the occurrence of SRVCC handover to the application processor.

Note that, the abovementioned operations and processes may be applied to the SRVCC handover from the CS call to the IMS call, and it is assumed that operation for the IMS call is handled by the modem side. For example, the modem side sends SRVCC handover occurrence indication to the application side. In addition, the application side may monitor the call state of the IMS call by sending the query messages and receiving the response messages to and from the modem side. Further, the modem side shall not send the response message indicating the call state of the CS call if the query message is received during the SRVCC handover, which may avoid the confusing the application side that the CS call is released suddenly and prevent the user interface from showing a warning message indicating the CS call is disconnected. The detailed description can be referred from above, so it is omitted herein.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In conclusion, various methods of monitoring call states over an SRVCC handover are provided, so that the application side may monitor the call state of the call maintained by modem side.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of monitoring a call state over a single radio voice call continuity (SRVCC) handover, for a communication device in a wireless communication system, comprising:
    performing, by a modem processor of the communication device, the SRVCC handover from a first type call to a second type call when an SRVCC handover command is received from a network of the wireless communication system;
    sending, by an application processor of the communication device, a query message to the modem processor to query the call state of the second type call; and
    sending, by the modem processor, a response message corresponding to the query message and containing the call state of the second type call, to the application processor after the SRVCC handover is performed successfully, wherein the call state is active, held, dialing, alerting, incoming or waiting;
    wherein the first type call is an Internet-Protocol Multimedia Subsystem (IMS) call and the second type call is a circuit-switched (CS) call, or the first type call is the CS call and the second type call is the IMS call.

2. The method of claim 1, further comprising:
    performing operation, by the application processor, for the first type call;

sending, by the modem processor, an indication for notifying an occurrence of SRVCC handover to the application processor; and stopping the operation, by the application processor, for the first type call after the indication is received.

3. The method of claim 2, wherein the step of sending, by the modem processor, the indication for notifying the occurrence of SRVCC handover to the application processor comprises:

sending, by the modem processor, the indication for notifying the occurrence of SRVCC handover to the application processor when the SRVCC handover is performed successfully.

4. The method of claim 1, further comprising:

sending, by the application processor, a query message to the modem processor to query a call state of the first type call;

sending, by the modem processor, a response message corresponding to the query message and containing a previous call state of the first type call if the query message is received during the SRVCC handover.

5. A method of monitoring a call state over a single radio voice call continuity (SRVCC) handover, for a communication device in a wireless communication system, comprising:

performing, by a modem processor of the communication device, handover from a first type call to a second type call when an SRVCC handover command is received from a network of the wireless communication system;

sending, by the modem processor, a first indication for indicating a call state of the second type call to an application processor of the communication device after the SRVCC handover, wherein the call state is active, held, dialing, alerting, incoming or waiting; and sending, by the modem processor, a third indication for indicating the call state of the second type call to the application processor when the call state of the second type call changes;

wherein the first type call is an Internet-Protocol Multimedia Subsystem (IMS) call and the second type call is a circuit-switched (CS) call, or the first type call is the CS call and the second type call is the IMS call.

6. The method of claim 5, further comprising:

performing operation, by the application processor, for the first type call;

sending, by the modem processor, a second indication for notifying an occurrence of SRVCC handover to the application processor; and stopping the operation, by the application processor, for the first type call after the first indication is received.

7. The method of claim 5, wherein sending, by the modem processor, the first indication for indicating the call state of the second type call after the SRVCC handover is performed successfully.

8. A communication device in a communication system, adapted for monitoring a call state over a single radio voice call continuity (SRVCC) handover, comprising:

a modem side;
an application side;
wherein the modem side comprises:
a modem storage unit, for storing instructions of:
performing handover from a first type call to a second type call when an SRVCC handover command is received from a network of the wireless communication system;

sending a first indication for indicating a call state of the second type call to the application side after the SRVCC handover, wherein the call state is active, held, dialing, alerting, incoming or waiting; and sending a third indication for indicating the call state of the second type call to the application side when the call state of the second type call changes wherein the first type call is an Internet-Protocol Multimedia Subsystem (IMS) call and the second type call is a circuit-switched (CS) call, or the first type call is the CS call and the second type call is the IMS call; and a modem processor, coupled to the modem storage unit, configured to executed the instructions stored in the modem storage unit;

wherein the application side comprises:
an application storage unit, for storing instructions;
an application processor, coupled to the application storage unit, configured to executed the instructions stored in the application storage unit.

9. The communication device of claim 8, wherein the application storage unit further store instructions of:
performing operation for the first type call;
stopping the operation for the first type call after the first indication is received;

wherein the modem storage unit further store instructions of:
sending a second indication for notifying an occurrence of SRVCC handover to the application side.

10. The communication device of claim 8, wherein the instruction of sending the first indication for indicating the call state of the second type call after the SRVCC handover comprises:

sending the first indication for indicating the call state of the second type call after the SRVCC handover is performed successfully.

* * * * *